United States Patent
Cho

(10) Patent No.: US 9,610,933 B2
(45) Date of Patent: Apr. 4, 2017

(54) APPARATUS AND METHOD FOR ELECTRONIC STABILITY CONTROL OF VEHICLE

(71) Applicant: MANDO CORPORATION, Pyeongtaek-si, Gyeonggi-do (KR)

(72) Inventor: Young Joo Cho, Seoul (KR)

(73) Assignee: MANDO CORPORATION, Pyeongtaek-si, Gyeonggi-do (KR)

(*) Notice: Subject to any disclaimer, the term of this patent is extended or adjusted under 35 U.S.C. 154(b) by 0 days.

(21) Appl. No.: 14/684,239

(22) Filed: Apr. 10, 2015

(65) Prior Publication Data

US 2015/0291147 A1   Oct. 15, 2015

(30) Foreign Application Priority Data

Apr. 11, 2014  (KR) .................. 10-2014-0043409

(51) Int. Cl.
*B60W 10/18* (2012.01)
*B60W 10/20* (2006.01)
(Continued)

(52) U.S. Cl.
CPC ......... *B60W 10/188* (2013.01); *B60T 8/1755* (2013.01); *B60T 8/17551* (2013.01);
(Continued)

(58) Field of Classification Search
CPC .............. B60W 10/188; B60W 10/20; B60W 2520/125; B60W 2520/10; B60W 2540/18;
(Continued)

(56) References Cited

U.S. PATENT DOCUMENTS 5,428,532 A * 6/1995 Yasuno ................. B60T 8/1755
180/197
6,415,215 B1 * 7/2002 Nishizaki ............. B60T 8/1755
180/167
(Continued)

FOREIGN PATENT DOCUMENTS

CN    101674965 A    3/2010
CN    101868391 A    10/2010
(Continued)

OTHER PUBLICATIONS

Chinese Office Action issued in Application No. 2015101676162 dated Jan. 4, 2017, with partial English translation.

*Primary Examiner* — Michael J Zanelli
(74) *Attorney, Agent, or Firm* — McDermott Will & Emery LLP

(57) ABSTRACT

A method for electronic stability control of a vehicle includes a compensated moment calculation operation of calculating a compensated moment according to an error between a desired turning speed calculated based on a steering angle and a vehicle speed of the vehicle and a turning speed of the vehicle; a compensated moment comparison operation of comparing the compensated moment calculated in the compensated moment calculation operation with a first reference value and a second reference value; steering rear wheels of the vehicle if it is determined that the compensated moment is equal to or larger than the first reference value and smaller than the second reference value; and a simultaneously performing steering of rear wheels of the vehicle and braking of the vehicle if it is determined that the compensated moment is equal to or larger than the second reference value.

8 Claims, 3 Drawing Sheets

(51) Int. Cl.
*B62D 7/15* (2006.01)
*B60T 8/1755* (2006.01)
*B60W 10/188* (2012.01)
*B60T 8/58* (2006.01)

(52) U.S. Cl.
CPC ............... *B60T 8/58* (2013.01); *B60W 10/20* (2013.01); *B62D 7/159* (2013.01); *B60T 2260/022* (2013.01); *B60W 2520/10* (2013.01); *B60W 2520/125* (2013.01); *B60W 2540/18* (2013.01)

(58) Field of Classification Search
CPC ......... B62D 7/159; B60T 8/1755; B60T 8/58; B60T 8/17551; B60T 2260/022
See application file for complete search history.

(56) References Cited

U.S. PATENT DOCUMENTS

| | | | |
|---|---|---|---|
| 6,560,524 B2* | 5/2003 | Lin | B60T 8/1755 180/6.2 |
| 6,856,885 B2* | 2/2005 | Lin | B60T 8/172 303/146 |
| 7,164,980 B1* | 1/2007 | Doll | B60T 8/1755 303/146 |
| 2004/0225427 A1* | 11/2004 | Anwar | B60G 17/0162 701/38 |

FOREIGN PATENT DOCUMENTS

| | | |
|---|---|---|
| CN | 101918265 A | 12/2010 |
| CN | 103237707 A | 8/2013 |
| KR | 10-2008-0086647 A | 9/2008 |

\* cited by examiner

APPARATUS AND METHOD FOR ELECTRONIC STABILITY CONTROL OF VEHICLE

CROSS-REFERENCE TO RELATED APPLICATION

This application claims the benefit of Korean Patent Application No. 2014-0043409, filed on Apr. 11, 2014 in the Korean Intellectual Property Office, the disclosure of which is incorporated herein by reference.

BACKGROUND

1. Field

Embodiments of the present invention relate to an apparatus for electronic stability control of a vehicle and a method thereof, and more particularly, to an apparatus for electronic stability control of a vehicle capable of controlling a vehicle by steering rear wheels of the vehicle, and a method thereof.

2. Description of the Related Art

In general, a system for electronic stability control of a vehicle refers to a system for ensuring a driving stability of a vehicle by controlling a driving force and a braking force of the vehicle at an adhesion limit between a tire and a road surface.

Such a system for electronic stability control system of a vehicle controls a driving force and a braking force to prevent understeer in which a vehicle is pushed outside of a desired trajectory, or oversteer in which a turning radius is rapidly reduced due to an undesired increase of a turning speed.

In a situation of understeer, a compensated moment acting toward the inside of a vehicle is generated by applying a braking force to inner rear wheels, and in a situation of the oversteer, a compensated moment acting toward the outside of a vehicle is generated by applying a braking force to outer front wheels.

Such a compensated moment is calculated based on a difference between an actual turning speed of a vehicle detected through a turning speed sensor and a desired turning speed calculated according to a vehicle model.

However, since the vehicle stability control is performed only using a braking force, a great amount of braking force is needed at the time of unstable behavior of a vehicle, and a driver interference greatly occurs, so that the driving pleasure is lowered.

PRIORITY ART DOCUMENT

Korean Unexamined Patent Publication No. 10-2008-0086647

SUMMARY

Therefore, it is an aspect of the present invention to provide an apparatus for electronic stability control of a vehicle capable of performing a rear wheel steering or simultaneously performing a rear wheel steering and a rear wheel braking by comparing a compensated moment with a plurality of reference values, and a method thereof.

Additional aspects of the invention will be set forth in part in the description which follows and, in part, will be obvious from the description, or may be learned by practice of the invention.

In accordance with one aspect of the present invention, a method for electronic stability control of a vehicle, capable of controlling a vehicle by using a steering angle, a vehicle speed, a turning speed and a lateral acceleration, the method includes: a compensated moment calculation operation of calculating a compensated moment according to an error between a desired turning speed calculated based on a steering angle and a vehicle speed of the vehicle and a turning speed of the vehicle; a compensated moment comparison operation of comparing the compensated moment calculated in the compensated moment calculation operation with a first reference value and a second reference value; a primary vehicle control operation of steering rear wheels of the vehicle if it is determined as a result of the compensated moment comparison operation that the compensated moment is equal to or larger than the first reference value and smaller than the second reference value; and a secondary vehicle control operation of simultaneously performing steering of rear wheels of the vehicle and braking of the vehicle if it is determined as a result of the compensated moment comparison operation that the compensated moment is equal to or larger than the second reference value.

In the primary vehicle control operation, the steering of the rear wheels of the vehicle may be performed in proportion to a difference between the compensated moment and the first reference value.

In the secondary vehicle control operation, the steering of the rear wheels of the vehicle may be performed in proportion to a difference between the second reference value and the first reference value.

In the secondary vehicle control step, the braking of the vehicle may be performed in proportion to a difference between the compensated moment and the second reference value.

In accordance with another aspect of the present disclosure, a method for electronic stability control of a vehicle, capable of controlling a vehicle by using a steering angle, a vehicle speed, a turning speed and a lateral acceleration, the method includes: a desired turning speed calculation operation of calculating a desired turning speed based on a steering angle and a vehicle speed of the vehicle; a turning speed error calculation operation of calculating a turning speed error between a turning speed of the vehicle and the desired turning speed calculated in the desired turning speed calculation operation; a compensated moment calculation operation of calculating a compensated moment according to the turning speed error calculated in the turning speed error calculation operation; a compensation moment comparison operation of comparing the compensated moment calculated in the compensated moment calculation operation with a first reference value and a second reference value; a primary compensated moment setting operation of setting a first compensated moment by using the compensated moment and the first reference value if it is determined as a result of the compensated moment comparison operation that the compensated moment is equal to or larger than the first reference value and smaller than the second reference value; a primary vehicle control operation of steering rear wheels of the vehicle according to the first compensated moment that is set according to the primary compensated moment setting operation; a secondary compensated moment setting operation of setting a first compensated moment by using the first reference value and the second reference value and setting a second compensated moment by using the compensated moment and the second reference value if it is determined as a result of the compensated moment comparison operation that the compensated moment is equal to or larger than the second reference value; and a secondary vehicle control operation of steering rear wheels of the vehicle according to the first compensated moment that is set in the secondary compensated moment setting operation, and braking the vehicle according to the second compensated moment.

In the primary compensated moment setting operation, the first compensated moment may be set according to a difference between the compensated moment and the first reference value; and in the primary vehicle control operation, the rear wheels of the vehicle are steered in proportion to the first compensated moment that may be set according to a difference between the compensated moment and the first reference value.

In the secondary compensated moment setting operation, the first compensated moment may be set according to a difference between the second reference value and the first reference value, and the second compensated moment may be set according to a difference between the compensated moment and the second reference value. In the secondary vehicle control operation, the rear wheels of the vehicle may be steered in proportion to the first compensated moment that is set according to a difference between the second reference value and the first reference value, and the vehicle may be braked in proportion to the second compensated moment that is set according to a difference between the compensated moment and the second reference value.

In accordance with another aspect of the present disclosure, an apparatus for electronic stability control of a vehicle, capable of controlling a vehicle by using a steering angle, a vehicle speed, a turning speed and a lateral acceleration, the apparatus includes a sensor unit, a rear wheel steering unit, a braking unit, a driving unit and a control unit. The sensor unit may be configured to sense a steering angle, a vehicle speed, a turning speed and a lateral acceleration of the vehicle. The rear wheel steering unit may be configured to steer rear wheels of the vehicle. The braking unit may be configured to adjust a braking force of the vehicle. The driving unit may be configured to adjust a driving force of the vehicle. The control unit may be configured to control the rear wheel steering unit, the braking unit and the driving unit according to a result of the sensing of the sensor unit. The control unit may calculate a compensated moment according to an error between a desired turning speed calculated based on a steering angle and a vehicle speed of the vehicle and a turning speed of the vehicle; compare the compensated moment with a first reference value and a second reference value; and control the rear wheel steering unit to steer rear wheels of the vehicle if the compensated moment is equal to or larger than the first reference value and smaller than the second reference value, and control the rear wheel steering unit and the braking unit such that the steering of the rear wheels of the vehicle and the braking of the vehicle are simultaneously performed if the compensated moment is equal to or larger than the second reference value.

The control unit, if the compensated moment is equal to or larger than the first reference value and smaller than the second reference value, may control the rear wheel steering unit in proportion to a difference between the compensated moment and the first reference value, and if the compensated moment is equal to or larger than the second reference value, control the rear wheel steering unit in proportion to a difference between the second reference value and the first reference value and control the braking unit in proportion to a difference between the compensated moment and the second reference value.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
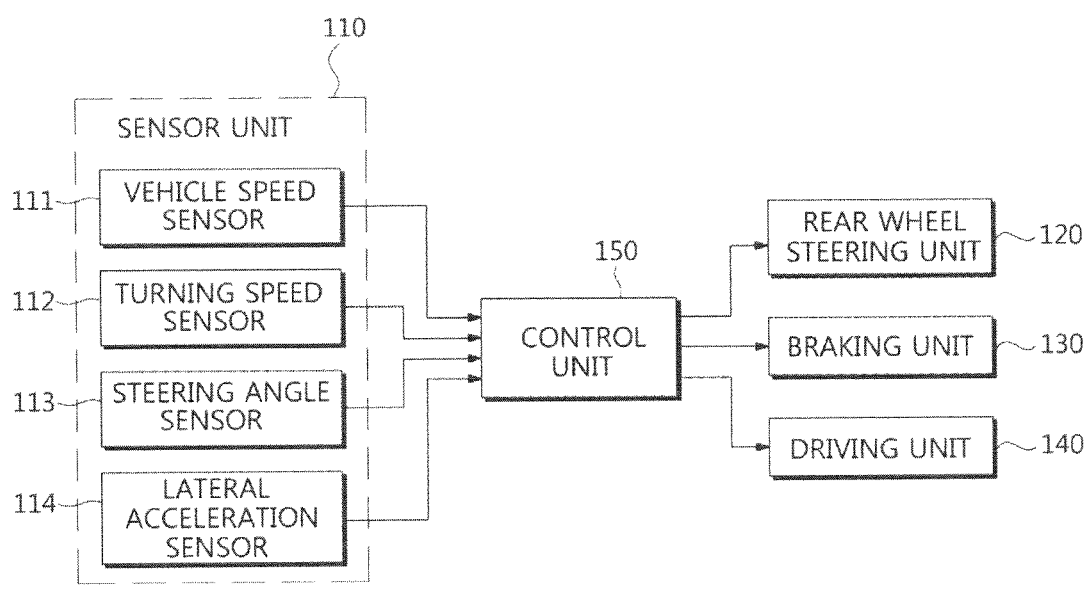
FIG. 1 is a block diagram illustrating an apparatus for electronic stability control of a vehicle in accordance with one embodiment of the present invention.

Various embodiments will now be described more fully with reference to the accompanying drawings in which some embodiments are shown. These inventive concepts may, however, be embodied in different forms and should not be construed as limited to the embodiments set forth herein. Rather, these embodiments are provided so that this disclosure is thorough and complete and fully conveys the inventive concept to those skilled in the art. In the drawings, the sizes and relative sizes of layers and regions may be exaggerated for clarity.

Referring to FIG. 1, an apparatus for electronic stability control of a vehicle for controlling a vehicle by using a steering angle, a vehicle speed, a turning speed and a lateral acceleration of the vehicle includes a sensor unit 110, a rear wheel steering unit 120, a braking unit 130, a driving unit 140 and a control unit 150.

The sensor unit 110 senses a steering angle, a vehicle speed, a turning speed and a lateral acceleration of a vehicle.

The sensor unit 110 may detect a steering angle, a vehicle speed, a turning speed and a lateral acceleration of a vehicle.

The sensor unit 110 may include a vehicle speed sensor 111, a turning speed sensor 112, a steering angle sensor 113 and a lateral acceleration sensor 114.

The vehicle speed sensor 111 senses a vehicle speed. The vehicle speed sensor 111 may be installed on each of wheels of the vehicle to sense a vehicle speed based on wheel speeds of the vehicle. The turning speed sensor 112 senses an actual turning speed of the vehicle. The steering angle sensor 113 senses a steering angle of a handle at the time of turning the vehicle. The lateral acceleration sensor 114 senses a lateral acceleration of the vehicle at the time of turning the vehicle.

The rear wheel steering unit 120 steers rear wheels of the vehicle.

The rear wheel steering unit 120 may steer the rear wheels of the vehicle by adjusting angles of the rear wheels of the vehicle.

The braking unit 130 adjusts a braking force of the vehicle.

The braking unit 130 may adjust the braking force of the vehicle by adjusting a hydraulic pressure applied to the wheels of the vehicle.

The braking unit 130 may adjust the braking force of the vehicle by adjusting a hydraulic pressure applied to at least one of the wheels of the vehicle.

The driving unit 140 adjusts a driving force of the vehicle.

The driving unit 140 may adjust the driving force of the vehicle by adjusting a torque generated from an engine of the vehicle.

The control unit 150 controls the rear wheel steering unit 120, the braking unit 130 and the driving unit 140 according to a result of the sensing of the sensor unit 110.

The control unit 150 calculates a compensated moment ΔM according to an error between a desired turning speed, that is, a desired yaw-rate $r_{desired}$ and a yaw-rate of the vehicle $r_{sensor}$.

The desired yaw-rate may be calculated based on a steering angle and a vehicle speed of the vehicle in Equation 1 as shown below.

$$r_{desired} = f(V_x, \delta_{teer}) \quad \text{[Equation 1]}$$

The error between the desired yaw-rate and the yaw-rate of the vehicle may be calculated through Equation 2.

$$r_{error} = r_{sensor} - r_{desired} \quad \text{[Equation 2]}$$

The compensated moment ΔM may be calculated through Equation 3. In Equation 3, P and D refer to a road surface specific control gain value and a vehicle speed specific control gain value, respectively.

$$\Delta M = P \times r_{error} + D \times \dot{r}_{error} \quad \text{[Equation 3]}$$

In addition, the control unit 150 compares the compensated moment ΔM with a first reference value $M_{th1}$ and a second reference value $M_{th2}$, and if the compensated moment ΔM is equal to or larger than the first reference value $M_{th1}$ and smaller than the second reference value $M_{th2}$, controls the rear wheel steering unit 120 such that the rear wheels of the vehicle are steered, and if the compensated moment ΔM is equal to or larger than the second reference value $M_{th2}$, simultaneously controls the rear wheel steering unit 120 and the braking unit 130 such that the steering of the rear wheels and the braking of the vehicle are performed.

In addition, the control unit 150, if the compensated moment ΔM is equal to or larger than the first reference value $M_{th1}$ and smaller than the second reference value $M_{th2}$, controls the rear wheel steering unit 120 in proportion to a difference between the compensated moment ΔM and the first reference value $M_{th1}$, and if the compensated moment ΔM is equal to or larger than the second reference value $M_{th2}$, controls the rear wheel steering unit 120 in proportion to a difference between the second reference value $M_{th2}$ and the first reference value $M_{th1}$, and controls the braking unit 130 in proportion to a difference between the compensated moment ΔM and the second reference value $M_{th2}$.

Meanwhile, the control unit 150, if the compensated moment ΔM is equal to or larger than the first reference value and smaller than the second reference value $M_{th2}$, calculates a first compensated moment $\Delta M^1$ by using the compensated moment ΔM and the first reference value $M_{th1}$ according to Equation 4.

$$\Delta M^1 = \Delta M - M_{th1} \quad \text{[Equation 4]}$$

The control unit 150 may control the rear wheel steering unit 120 of the vehicle according the first compensated moment $\Delta M^1$.

The control unit 150 controls the rear wheel steering unit 120 by setting a rear wheel steering angle $\delta_r$ to be in proportion to the first compensated moment $\Delta M^1$.

$$\delta_r = K_1 \times \Delta M^1 \quad \text{[Equation 5]}$$

Meanwhile, the control unit 150 may control the rear wheel steering unit 120 and the braking unit 130 by using the compensated moment ΔM to be divided between the rear wheel steering unit 120 and the braking unit 130 if the compensated moment ΔM is equal to or larger than the second reference value $M_{th2}$.

The control unit 150 may calculate a first compensated moment $\Delta M^1$ by using the second reference value and the first reference value according to Equation 6 if the compensated moment ΔM is equal to or larger than the second reference value $M_{th2}$.

$$\Delta M^1 = M_{th2} - M_{th1} \quad \text{[Equation 6]}$$

The control unit 150 may control the rear wheel steering unit 120 by setting the rear wheel steering angle $\delta_r$ to be proportional to the first compensated moment $\Delta M^1$, which is calculated by Equation 6, according to Equation 5.

The control unit 150 may calculate a second compensated moment $\Delta M^2$ by using the compensated moment ΔM and the second reference value $M_{th2}$ according to Equation 7 if the compensated moment ΔM is equal to or larger than the second reference value $M_{th2}$.

$$\Delta M^2 = \Delta M - M_{th2} \quad \text{[Equation 7]}$$

The control unit 150 may control the braking unit 130 of the vehicle according to the second compensated moment $\Delta M^2$.

The control unit 150 may control the braking unit 130 by setting a braking moment $\Delta M_{brake}$ to be proportional to the second compensated moment $\Delta M^2$ according to Equation 8.

$$\Delta M_{brake} = \Delta M^2 \quad \text{[Equation 8]}$$

The control unit 150 may calculate the rear wheel steering angle $\delta_r$ and the braking moment $\Delta M_{brake}$ by changing a proportional constant $K_1$, the first reference value $M_{th1}$ and the second reference value $M_{th2}$ according to a dynamic behavior characteristic signal of the vehicle.

The dynamic behavior characteristic of the vehicle may be expressed as a side slip angle and a lateral acceleration angle of the vehicle.

Figure 2:
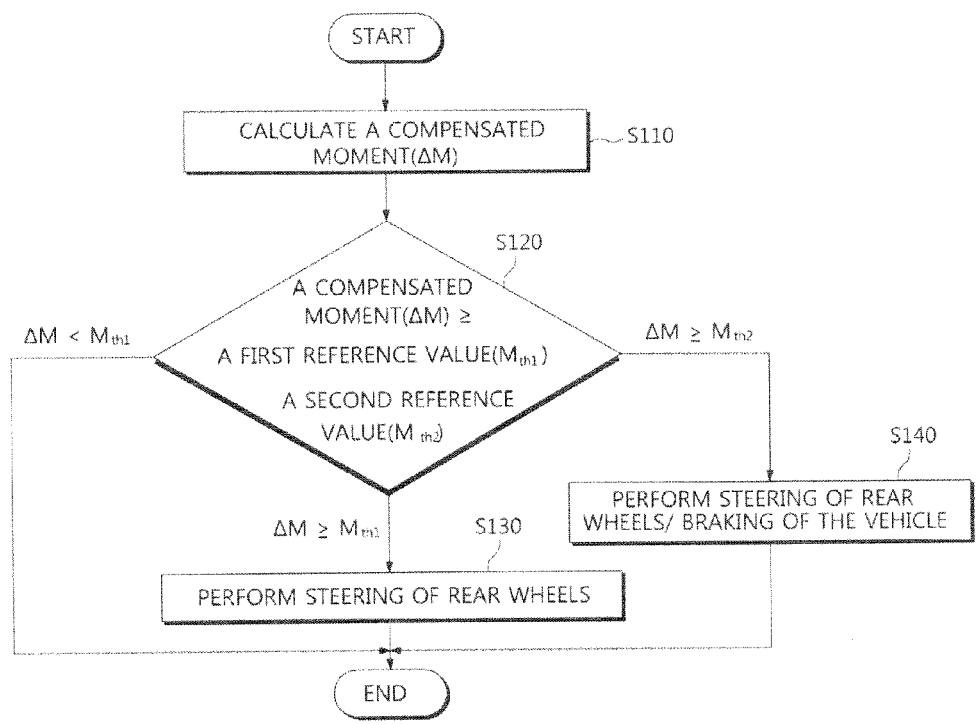
FIG. 2 is a flowchart showing a method for electronic stability control in accordance with another embodiment of the present invention.

Hereinafter, a method for electronic stability control of a vehicle in accordance with another embodiment of the present invention will be described with reference to FIG. 2.

The method for electronic stability control of a vehicle by using a steering angle, a vehicle speed, a turning speed and a lateral acceleration in accordance with the embodiment of the present invention includes a compensated moment calculation operation (S110), a compensated moment comparison operation (S120), a primary vehicle control operation (S130) and a secondary vehicle control operation (S140).

In the compensated moment calculation operation (S110), a compensated moment ΔM is calculated according to an error between a desired yaw-rate calculated based on a steering angle and a vehicle speed of the vehicle and a yaw-rate of the vehicle.

In the compensated moment comparison operation (S120), the compensated moment ΔM calculated through the compensated moment calculation operation (S12) is compared with a first reference value $M_{th1}$ and a second reference value $M_{th2}$.

In the primary vehicle control operation (S130), a steering of rear wheels is performed if it is determined as a result of the compensated moment comparison operation (S120) that the compensated moment ΔM is equal to or larger than the first reference value $M_{th1}$ and smaller than the second reference value $M_{th2}$.

In the primary vehicle control operation (S130), the steering of the rear wheels of the vehicle may be performed in proportion to a difference between the compensated moment ΔM and the first reference value $M_{th1}$.

In the secondary vehicle control operation (S140), a steering of rear wheels of the vehicle and a braking of the vehicle are simultaneously performed if it is determined as a result of the compensated moment comparison operation (S120) that the compensated moment ΔM is equal to or larger than the second reference value $M_{th2}$.

In the secondary vehicle control operation (S140), the steering of the rear wheels may be performed in proportion to a difference between the second reference value $M_{th2}$ and the first reference value $M_{th1}$.

In the secondary vehicle control operation (S140), the braking of the vehicle may be performed in proportion to a difference between the compensated moment ΔM and the second reference value $M_{th2}$.

Figure 3:
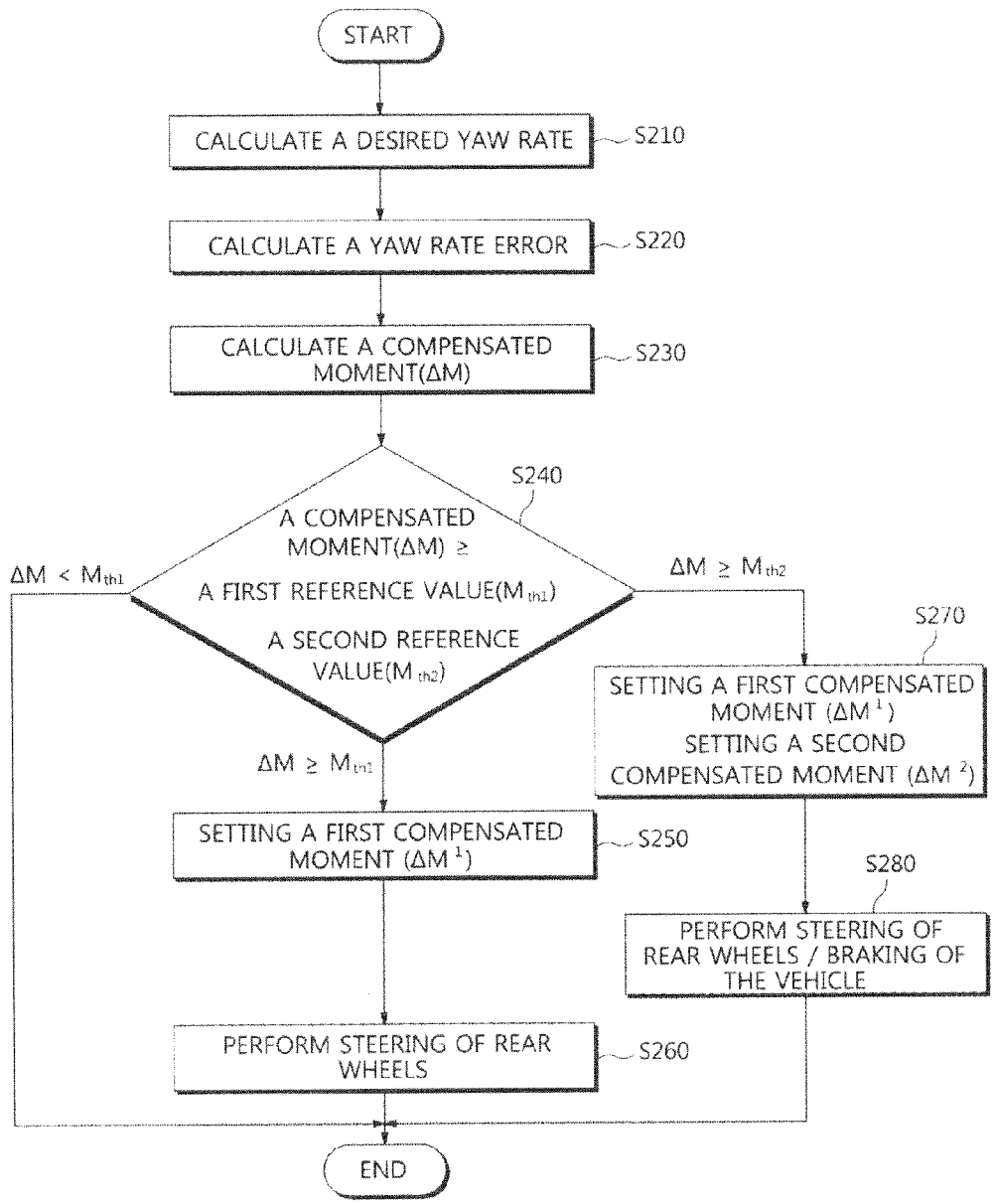
FIG. 3 is a flowchart showing a method for electronic stability control in accordance with still another embodiment of the present invention.

Hereinafter, a method for electronic stability control of a vehicle in accordance with still another embodiment of the present invention will be described with reference to FIG. 3.

The method for electronic stability control of a vehicle by using a steering angle, a vehicle speed, a turning speed and a lateral acceleration in accordance with the embodiment of the present invention includes a desired yaw rate calculation operation (S210), a yaw rate error calculation operation (S220), a compensated moment calculation operation (S230), a yaw moment comparison operation (S240), a primary compensated moment setting operation (S250), a primary vehicle control operation (S260), a secondary compensated moment setting operation (S270) and a secondary vehicle control operation (S280).

In the desired yaw-rate calculation operation (S210), a desired yaw-rate is calculated based on a steering angle and a vehicle speed of a vehicle.

In the yaw-rate error calculation operation (S220), a yaw-rate error is calculated according to a yaw rate of the vehicle and the desired yaw-rate calculated in the desired yaw-rate calculation operation (S210).

In the compensated moment calculation operation (S230), a compensated moment ΔM is calculated according to the yaw rate error calculated in the yaw rate error calculation operation (S220).

In the yaw-moment comparison operation (S240), the compensated moment ΔM calculated in the compensated moment calculation operation (S230) is compared with the first reference value $M_{th1}$ and the second reference value $M_{th2}$.

In the primary compensated moment setting operation (S250), a first compensated moment $ΔM^1$ is set by using the compensated moment ΔM and the first reference value $M_{th1}$, if it is determined as a result of the compensated moment comparison operation (S240) that the compensated moment ΔM is equal to or larger than the first reference value $ΔM^1$ and smaller than the second reference value $M_{th2}$.

In the primary compensated moment setting operation (S250), the first compensated moment $ΔM^1$ is set according to a difference between the compensated moment ΔM and the first reference value $M_{th1}$.

In the primary vehicle control operation (S260), rear wheels of the vehicle are steed according to the first compensated moment $ΔM^1$ set through the primary compensated moment setting operation (S250).

In the primary vehicle control operation (S260), the rear wheels of the vehicle may be steered in proportion to the first compensated moment $ΔM^1$ set according to a difference between the compensated moment ΔM and the first reference value $M_{th1}$.

In the secondary compensated moment setting operation (S270), a first compensated moment $ΔM^1$ is set by using the first reference value $M_{th1}$ and the second reference value $M_{th2}$ and a second compensated moment $ΔM^2$ is set by using the compensated moment ΔM and the second reference value $M_{th2}$ if it is determined as a result of the compensated moment comparison operation (S240) that the compensated moment ΔM is equal to or larger than the second reference value $M_{th2}$.

In the secondary compensated moment setting operation (S270), the first compensated moment $ΔM^1$ is set according to a difference between the second reference value $M_{th2}$ and the first reference value $M_{th1}$, and the second compensated moment $ΔM^2$ is set according to a difference between the compensated moment ΔM and the second reference value $M_{th2}$.

In the secondary vehicle control operation (S280), rear wheels of the vehicle are steered according to the first compensated moment $ΔM^1$ that is set through the secondary compensated moment setting operation (S270), and the vehicle is braked according to the second compensated moment $ΔM^2$ that is set through the secondary compensated moment setting operation (S270).

In the secondary vehicle control operation (S280), the rear wheels of the vehicle may be steered in proportion to the first compensated moment $ΔM^1$ that is set according to a difference between the second reference value $M_{th2}$ and the first reference value $M_{th1}$, and the vehicle may be braked in proportion to the second compensated moment $ΔM^2$ that is set according to a difference between the compensated moment ΔM and the second reference value $M_{th2}$.

As is apparent from the above, since a driving stability is achieved by steering rear wheels of a vehicle, the vehicle can be rapidly stabilized.

In addition, in order to stabilize a vehicle, a rear wheel steering is performed or a rear wheel steering and a rear wheel braking are simultaneously performed by comparing a compensated moment of a vehicle with a plurality of reference values, so that generation of braking force can be reduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method for electronic stability control of a vehicle, capable of controlling the vehicle by using a steering angle, a vehicle speed, and a turning speed, the method comprising:
   a compensated moment calculation operation of calculating a compensated moment according to an error between a desired turning speed, which is calculated based on the steering angle and the vehicle speed of the vehicle, and the turning speed of the vehicle;
   a compensated moment comparison operation of comparing the compensated moment calculated in the compensated moment calculation operation with a first reference value and a second reference value;
   a primary vehicle control operation of steering rear wheels of the vehicle if it is determined as a result of the compensated moment comparison operation that the compensated moment is equal to or larger than the first reference value and smaller than the second reference value; and
   a secondary vehicle control operation of simultaneously performing steering of rear wheels of the vehicle and braking of the vehicle if it is determined as a result of the compensated moment comparison operation that the compensated moment is equal to or larger than the second reference value,
   wherein in the secondary vehicle control operation, the steering of the rear wheels of the vehicle is performed according to a difference between the second reference value and the first reference value.

2. The method of claim 1, wherein in the primary vehicle control operation, the steering of the rear wheels of the vehicle is performed in proportion to a difference between the compensated moment and the first reference value.

3. The method of claim 1, wherein in the secondary vehicle control step, the braking of the vehicle is performed in proportion to a difference between the compensated moment and the second reference value.

4. A method for electronic stability control of a vehicle, capable of controlling the vehicle by using a steering angle, a vehicle speed, and a turning speed, the method comprising:
  a desired turning speed calculation operation of calculating a desired turning speed based on the steering angle and the vehicle speed;
  a turning speed error calculation operation of calculating a turning speed error between the turning speed of the vehicle and the desired turning speed calculated in the desired turning speed calculation operation;
  a compensated moment calculation operation of calculating a compensated moment according to the turning speed error calculated in the turning speed error calculation operation;
  a compensation moment comparison operation of comparing the compensated moment calculated in the compensated moment calculation operation with a first reference value and a second reference value;
  a primary compensated moment setting operation of setting a first compensated moment by using the compensated moment and the first reference value if it is determined as a result of the compensated moment comparison operation that the compensated moment is equal to or larger than the first reference value and smaller than the second reference value;
  a primary vehicle control operation of steering rear wheels of the vehicle according to the first compensated moment that is set according to the primary compensated moment setting operation;
  a secondary compensated moment setting operation of setting a first compensated moment by using the first reference value and the second reference value and setting a second compensated moment by using the compensated moment and the second reference value if it is determined as a result of the compensated moment comparison operation that the compensated moment is equal to or larger than the second reference value; and
  a secondary vehicle control operation of steering rear wheels of the vehicle according to the first compensated moment that is set in the secondary compensated moment setting operation, and braking the vehicle according to the second compensated moment,
  wherein, in the secondary vehicle control operation, the rear wheels of the vehicle are steered according to the first compensated moment that is set according to a difference between the second reference value and the first reference value.

5. The method of claim 4, wherein
  in the primary compensated moment setting operation, the first compensated moment is set according to a difference between the compensated moment and the first reference value; and
  in the primary vehicle control operation, the rear wheels of the vehicle are steered in proportion to the first compensated moment that is set according to the difference between the compensated moment and the first reference value.

6. The method of claim 4, wherein
  in the secondary compensated moment setting operation, the first compensated moment is set according to the difference between the second reference value and the first reference value, and the second compensated moment is set according to a difference between the compensated moment and the second reference value, and
  in the secondary vehicle control operation, the vehicle is braked in proportion to the second compensated moment that is set according to the difference between the compensated moment and the second reference value.

7. An apparatus for electronic stability control of a vehicle, capable of controlling the vehicle by using a steering angle, a vehicle speed, a turning speed, and a lateral acceleration, the apparatus comprising:
  a sensor unit configured to sense the steering angle, the vehicle speed, the turning speed, and the lateral acceleration of the vehicle; and
  controller configured to control: steering of rear wheels of the vehicle; adjustment of a braking force of the vehicle; and adjustment a driving force of the vehicle, according to a result of the sensing of the sensor unit,
  wherein the controller calculates a compensated moment according to an error between a desired turning speed calculated based on the steering angle and the vehicle speed and a turning speed of the vehicle; compares the compensated moment with a first reference value and a second reference value; and controls to steer rear wheels of the vehicle if the compensated moment is equal to or larger than the first reference value and smaller than the second reference value, and controls such that the steering of the rear wheels of the vehicle and the braking of the vehicle are simultaneously performed if the compensated moment is equal to or larger than the second reference value, and
  wherein the controller, if the compensated moment is equal to or larger than the second reference value, controls the rear wheel steering according to a difference between the second reference value and the first reference value.

8. The apparatus of claim 7, wherein the controller, if the compensated moment is equal to or larger than the first reference value and smaller than the second reference value, controls the rear wheel steering in proportion to a difference between the compensated moment and the first reference value, and if the compensated moment is equal to or larger than the second reference value, controls the braking in proportion to a difference between the compensated moment and the second reference value.

* * * * *